United States Patent [19]
Allen

[11] 3,878,724
[45] Apr. 22, 1975

[54] PHYSICALLY REALIZABLE OPTIMUM PREDICTOR FILTER TECHNIQUE FOR TRANSDUCERS, SENSORS, AND OTHER MASSIVE DEVICES, BASED UPON INVERSE TRANSFERS FUNCTION SYNTHESIS

[76] Inventor: Gerald F. Allen, 532 Bucknell Ave., Claremont, Calif. 91711

[22] Filed: Nov. 16, 1972

[21] Appl. No.: 307,019

[52] U.S. Cl. ........ 73/362 AR; 73/359; 235/151.3 R; 328/142; 333/19
[51] Int. Cl. ........ G01k 7/24; G01k 3/04; G06a 7/19
[58] Field of Search ........... 73/359, 362 R, 362 AR; 235/151.3 R; 328/127, 128, 142; 333/14

[56] References Cited
UNITED STATES PATENTS
3,792,363   2/1974   Gebel et al. .................... 328/127 X

Primary Examiner—Richard C. Queisser
Assistant Examiner—Frederick Shoon
Attorney, Agent, or Firm—Bacon & Thomas

[57] ABSTRACT
Extending the application of transfer function cancellation or compensation via a separate filter to the sensormedia regime itself; with the objective of cancelling out sensor response time lags. This is achieved by first analyzing the transfer function of the sensor-media combination of interest, then synthesizing a filter that essentially cancels out that transfer function. Prior filter (electronic, mechanical, etc.) art has presumed the output of a sensor or transducer to be the reference input for all practical purposes of analysis and synthesis.

To rapidly and practically derive this transfer function, the inventor has developed a graphical technique that directly extracts exponential terms from time-response data plotted on semilogarithmic graph paper, thereby directly yielding terms of the corresponding transfer function; i.e., Laplace transform of response as a function of time.

The effective cancellation of heretofore-accepted sensor response-time limitations, makes possible drastic reductions in measurement and system response times, where these response times are primarily limited by the mechanical, electronic, acoustic, thermodynamic, or particle limitations of the sensors or transducers employed.

14 Claims, 15 Drawing Figures

FIG.1

FIG.2A  $i(t)$ TEMP OF MEDIUM

FIG.2B  $f(t) = o(t)*g(t)$  TEMP RESPONSE OF SENSOR

FIG.2C  $o(t)$ OUTPUT FROM PREDICTION FILTER

FIG. 3

PERCENTAGE DIFFERENTIAL BETWEEN INITIAL AND FINAL PROBE TEMPERATURE REGISTRATION

RECORDING OF THERMOMETER OUTPUT VOLTAGE SCALED TO PERCENTAGE OF RESPONSE

PHYSICALLY REALIZABLE OPTIMUM PREDICTOR FILTER TECHNIQUE FOR TRANSDUCERS, SENSORS, AND OTHER MASSIVE DEVICES, BASED UPON INVERSE TRANSFERS FUNCTION SYNTHESIS

BACKGROUND OF THE INVENTION

Control and measurement-system engineers normally limit the application of their art to the so-called reference input signal, optimizing response of the controlled variable based upon the reference input signal as given. Any compensation filter synthesized has neither considered the effective transfer function between "raw" or basic excitation and the "taken-for-granted" reference input signal, nor applied compensation appropriate to this transfer function. As a result, the response of many control (including, of course, measurement) systems remains limited by the input transduction or sensing process. To a less significant extent, overall system response may be limited by lags in the indirectly controlled system elements.

Rather than attempting to acknowledge and identify the transfer function representing, say, the transducer, and/or the vicinity of the transducer-medium interface, the conventional approach has been to minimize the influence of the sensor/transducer upon the medium. This is usually accomplished by the logical process of minimizing size, mass, energy-transfer losses between medium and sensor, energy consumption or dissipation, and any other disturbances introduced by the presence or influence of the sensor.

Certainly a large class of transducer elements exist, having adequately fast response, that introduce no practical or significant limits on the measurements they effect. For example, optical photo sensors involve virtually massless atomic or subatomic particle or energy transfer. With response times in the order of microseconds or milliseconds, such sensors may be considered characteristicless relative to sensors involving substantial inertia, as for example sensors included in the measuring or sensing of large, massive mechanical systems or devices.

Once the "smallest, most chatacteristicless" transducer is developed or incorporated in a control or measurement system, its limiting response is accepted or taken for granted. The associated system is then usually designed to introduce a minimal amount of error or additional response lag, using generally accepted principles of measurement and control system theory and design.

Mathematical characterizations of transducers have usually been developed from theoretical approximations and differential equations. In the case of temperature transducers, which are perhaps the most difficult devices to characterize and possess the slowest response times, Newton's Law of Cooling is used to approximate transducer response in terms of a simple first order time constant. Such single-exponential-term models are adequate to suggest gross response times, but admittedly do not follow observed transducer responses too closely. No evidence has been found of efforts to analyze actual temperature transducer transfer functions from actual data, or to extract the most significant time-response equations contained within easily-obtained experimental data.

Prior art stemming from the recognition of sensor or transducer time lags, specifically in temperature probes, has employed additional sensors differing in size, location and heat transfer characteristics. Examples of prior art of this general type are found in the disclosures in U.S. Pat. Nos. 3,279,256, 3,286,524, and 3,290,940, issued respectively to Rainge, Malone, and Hines. In this type of prior art, the sensor array is connected in the most appropriate bridge configuration to achieve an algebraic summation of the sensor outputs that effectively reduce the overall assembly first-order time lag, but in no way achieves near-zero response time. In fact the time to say 99 percent response time is increased due to the additional sensor mass imposed by the sensor array. Errors exist up to the equilibrium temperature point, due to the imperfections inherent in simple algebraic summation of exponential terms, and nonideal heat flow into the sensor array. Furthermore, identification and subsequent cancellation of the sensor-media interface is neither involved nor recognized in the prior art.

Extrapolation techniques have also been accepted, based upon the classic first order time-constant model of a sensor, that observe the response amplitude of a sensor over a prescribed time period, then estimate the actual (higher) temperature of the subject body. This was applied to cases where the subject temperature exceeded the limits of the sensor materials. Cooling intervals alternated with observation intervals on a periodic basis until equilibrium was established, then a subject-temperature extrapolation estimate was computed. An example of this prior art approach is found in the disclosure in U.S. Pat. No. 3,111,032, to Wormser et al. This results in an even slower overall time response.

SUMMARY OF THE INVENTION

Fundamentally, the present invention pushes transfer function compensation a full step forward in the art — to the medium surrounding the transducer or sensor. According to the invention the transfer function of the sensor-medium combination in question is determined, and based upon this information a filter is determined providing a transfer function that will cancel out the transfer function characteristic of the sensor-medium combination.

Thus it becomes possible with the present invention to reduce the response lag, characteristic of a real sensor, to extremely small values. The minimun response times achievable are limited by the practical consideration of the range of sensor-medium combination accommodation desired. If an invariable or non-changing medium situation exists, then the achievable response time can be reduced by the invention to the limits imposed only by response and transfer function limitations of real sensor and filter devices. As an example of this, a rectal-temperature thermometer, included in the present invention, is subject to variations in the thermodynamic properties of fecal matter, intestine and colon structure. The entry of cooling air, plus the removal of heat by the rectal probe in repetitive applications to the same specimen, can also become important factors to consider.

Hence, in adopting the present invention to any form of measurement or control system, the compensating filter design should be based on average conditions, making a perfect design not only unnecessary, but undesirable. It appears, for most practical applications, that the appropriate filter transfer function can be limited to two or less poles and two or less zeros.

Thus, the present invention acknowledges the transfer function that naturally exists between basic or "raw" input excitation and the reference input; acknowledges the similar transfer functions that exist with other inputs to the system, as well as with indirectly controlled system elements; and generates and applies a canceling transfer function to provide an overall response time approaching zero.

The invention includes as a part thereof a novel mathematical relaxation method, applicable to graphical or simplified computer solution, for deriving the transfer function of, say, the input elements and associated environment, from empirical transient response data.

The efficacy of the present invention has been demonstrated by a practical embodiment in a medical electronic thermometer which achieves a response time one order of magnitude less than existing thermometers, and this difference is emphasized by the highly competitive nature of this particular market. Furthermore, this response is achieved with an extraordinarily heavy thick-walled stainless steel probe, as opposed to the inherently fragile low-mass probe designs customarily needed for fast-response thermometers.

Accordingly, it is an object of the present invention to make possible the design and use of larger, more rugged and more functional transducers that compromise response time in favor of utility. In eliminating the customary requirement for speed of response, the problems of fragility inherent in low-mass high-speed transducers are also eliminated. In medical thermometer applications, for example, rugged temperature probe assemblies can be designed and used in conjunction with inexpensive, response-inhibiting disposable sheaths. When accommodated by an input filter according to the invention, there is virtually no resultant degradation in the speed with which temperature readings can be obtained.

Another object is to apply the present invention as one practical example, to an electronic medical thermometer; thereby enabling nearly instantaneous body temperature measurements. A new simple disposable probe sheath design is also included as a part of the invention, and the ability to employ the latter without substantial degradation of the response time illustrates the substantially complete independence of response speed upon probe construction.

Another object of the present invention is to include applicability to filter implementations of any physical nature, mechanical, acoustic, fluidic, pneumatic, or approaches involving solid state physics, particle dynamics or controlled energy, as well as the electric network approach exemplified within this disclosure, or any combinations thereof (e.g., electroacoustic).

Another object is to provide novel electric circuit means of the character described which contribute to simplicity of design, extraordinary stability, and readout/display protection necessitated by the extraordinary accelerations imposed upon display device components by fast-response display input signals from the prediction filter means of the present invention.

A further object is to provide novel disposable thermometer sheath means of the character described, having advantage of functional characteristics uncompromised by heat transfer requirements, low cost, or ease of application and dispensation.

A still further object of the invention is to provide a system of the character described which is applicable to timevarying, non-linear, or digital systems as well as to linear systems exemplified within this disclosure. Usually, devices of interest, such as transducers, are non-linear but behave linearly over the operating regime of interest. In cases where lumped-parameter filter embodiments are inadequate, distributedparameter embodiments may, of course, be employed. Also, adaptive techniques may be applied to adjust filter constants to correspond with determinable changes in transducer-medium (or device-medium) transfer functions.

Further objects and advantages of the present invention will appear during the course of the following part of the specification, wherein the details of construction, mode of operation, and novel method steps of presently preferred embodiments are described with reference to the accompanying drawings, in which:

DETAILED DESCRIPTION

The Use and Meaning of Transfer Functions as Applied in the Present Disclosure Functional blocks in control systems diagrams, as well as in proper electronic or mechanical circuit diagrams, represent transfer functions of the component or group of components identified by the blocks. Transfer functions are obtained from the differential equation relating function output to input, replacing the differential operator ($d/dt$) by the relevant complex variable ($s$) or Laplacian operator, and solving the resultant simplified algebraic expression for the ratio of output to input.

Transforming the differential equations adequately representing real systems components into complex variable equivalents grossly simplifies system analysis. For example, the output of a system element energized by some signal can be determined in the time domain only through the unwieldy mathematical task of convolution, whereas in terms of the complex variable transform, the output is given by the simple algebraic product of the input signal transform and the transfer function of the element.

More advanced mathematical representations and techniques have been developed to expedite analysis/synthesis of more exotic and non-linear control systems. However, the real systems to which the present invention will normally be applied are principally linear in nature, whereby compensating filter realizations according to the present invention can generally be achieved through the transfer function complex-variable, Laplace transform approach described in detail hereinafter. Nevertherless, the compensating filter means defined herein is itself a significant part of the present invention independent of such complex-variable approach for effecting the synthesis thereof.

Quoting from J. G. Truxall, *Automatic Feedback Control System Synthesis*, McGraw-Hill, 1955, page 35: "The Laplace transform permits consideration of analysis and design problems in terms of complex frequency $s = \sigma + j\omega$ (used because of its powerful mathematical attributes, enabling the Laplace variable, $s$, to be applied to non-infinite time phenomena), rather than in terms of time functions. The great utility of Laplace transform methodology stems from the fact that differentiation of the time function corresponds to multiplication of the transform by $s$. Differential equations in time become algebraic equations in $s$; likewise, the analysis and synthesis problems for linear circuits are grossly simplified if the time functions are described by transforms, and the network by an appropriate transfer function in terms of $s$.

Accordingly, the mechanization of the present invention makes use of known and established practices in filter analysis and synthesis in terms of complex-domain functions, including transfer functions, Laplace transforms, and the like, and in the translation of optimum cancellation or compensation transfer functions into realizable lumped-element (such as R, L, and C in electric systems) filters.

SYNOPSIS

Distinguishing fundamentals of compensation for sensor and/or system response time lags according to the present invention are:

1. Recognition of the disarmingly simple fact that system inputs are more correctly interpreted as the raw inputs presumably sensed by transducers, not the output of the transducers themselves.
2. Carrying optimum compensation filter practice one step further "forward" (toward the actual input) in any given measurement or control system.
3. Recognizing the necessity of considering the media and media-transducer-interface characteristics if a sufficiently accurate assessment of the overall transducer transfer function is to be obtained.

The complex (Laplace) transform of the time domain response of an excited transducer yields the product of the transducer input excitation transform and the transfer function of the transducer-medium-interface combination. Division of the overall transform by the transform of the known excitation function, will yield the transfer function of the transducermedium-interface combination. The inverse of this transfer function, or practical approximation thereof, represents the transfer function of the optimum pure predictor according to the invention. By definition, then, the present predictor ideally "cancels out" the transducer influence, and yields virtually unperturbed information about the medium variable of interest, such that the differences in amplitude and time response between the actual excitation input and the predictor filter output are minimized. Ideally, within an observation interval approaching zero, the raw input information is determined with an error approaching zero. Such ideal limits do not exist with prior art.

Figure 1:
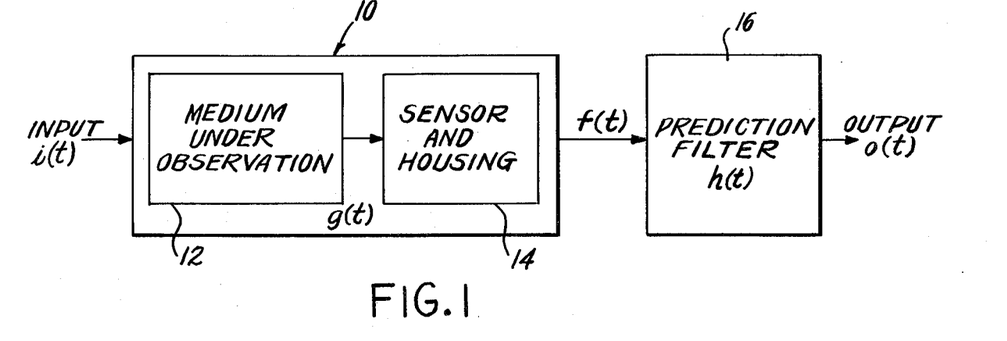
FIG. 1 is a block diagram illustrating the relationship between the input excitation function $i(t)$, sensor-medium combination function $g(t)$, sensor output function $f(t)$, and canceling predicting filter function $h(t)$.

This fundamental concept of the present invention is illustrated in FIG. 1, which diagrammatically illustrates the time domain relationship between the input excitation, the medium under observation, the sensor, the prediction filter of the present invention, and the compensated output.

In FIG. 1, the block 10 designates the sensor-medium combination, the medium under observation being designated 12, and the sensor being designated 14. In the example frequently referred to herein, the medium 12 is a stirred bath, and the sensor a thermometer probe comprising a thermister or the like and its housing. The prediction filter of the invention is represented by the block designated 16.

The input excitation function $i(t)$ is applied to the sensor-medium combination 10 having the function $g(t)$, thereby producing sensor output function $f(t)$, the latter having heretofore generally being accepted as the system input according to conventional practice. The canceling predictor filter 16 has the compensation function $h(t)$, resulting in idealized output $o(t)$ of the prediction filter 16.

By definition $$o(t) = i(t) * g(t) * h(t) \qquad \text{I}$$

where * represents convolution. This expression may be represented in terms of Laplace transforms as follows:

$$O(s) = I(s)\, G(s)\, H(s) \qquad \text{II}$$

The present invention imposes the following sufficient condition:

$$H(s) = 1/G(s) \qquad \text{III}$$

Figure 2A:
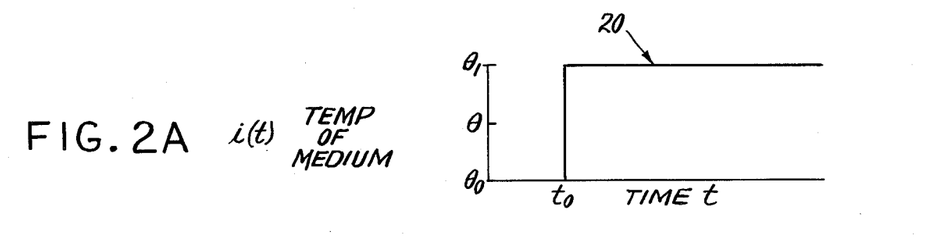
FIGS. 2A, 2B, and 2C graphically illustrate the functions diagrammatically related to FIG. 2, for an example in which a temperature sensor is immersed in a sample medium.
Figure 2B:
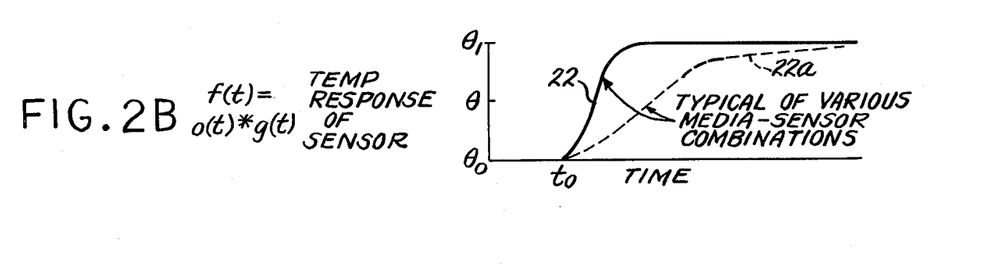
Figure 2C:
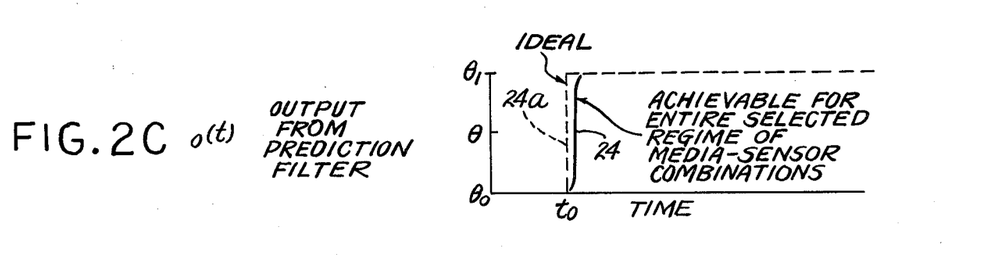

FIGS. 2A, 2B, and 2C graphically illustrate the functions referred to above in connection with the block diagram of FIG. 1, for the temperature measurement example wherein a thermometer probe is plunged into a sample medium, the probe having an initial temperature $\theta_0$ and the medium having a temperature $\theta_1$. FIGS. 2A, 2B, and 2C all are plots of temperature $\theta$ between $\theta_0$ and $\theta_1$ against time, indicating the initial time of immersion.

In FIG. 2A, the curve 20 represents the input excitation function $i(t)$ which is a step-function between $\theta_0$ and $\theta_1$.

In FIG. 2B, the solid line curve 22 and the dotted line curve 22a represent the sensor output function $f(t)$ for typical media-sensor combinations. Here, $$f(t) = i(t) * g(t) \qquad \text{IV}$$

Curves 22 and 22a illustrate the large time lags before the sensor output becomes generally asymptotic to the medium temperature $\theta_1$. A typical time lag for a conventional electronic thermometer for the output to reach 99 percent of $\theta_1$ will be on the order of 10 to 15 seconds, and as aforesaid, such lags were heretofore generally accepted as system inputs.

FIG. 2C is plotted for the same time-temperature scale as FIGS. 2A and 2B, and shows solid line curve 24 that represents the output $o(t)$ from the prediction filter of the present invention. The curve 24 is compared in FIG. 2C with the ideal step function output represented by the dotted line curve 24a. The greatly reduced time lag resulting from compensation by the present prediction filter will be apparent from a comparison between the curve 24 of FIG. 2C on the one hand and the curves 22 and 22a of FIG. 2B on the other. 99 percent response time for an electronic thermometer with the present prediction will normally be less than one second.

This pure, deceptively simple concept is particularly applicable to any system in which the transfer function of the transducer-medium-interface is either invariant or determinable. Thus, for example, adaptive techniques can be applied to the parameters of prediction filters of the present invention to maintain adequate correspondence between the filter and the inverse of the transducer-medium-interface transfer function.

Even in cases where adaptive control of filter parameters cannot maintain a near-perfect match, the degree of optimization realized may still prove superior to that achievable through conventional practice alone.

A most significant quality of the inverse transfer function criterion of the invention is that the optimization achieved remains independent of actual input signal waveform. Transients and aperiodic inputs such as step functions, as well as periodic inputs, are accommodated. However, practical limits suggest tailoring actual filter design to the class of signals to be accommodated.

Throughout the present disclosure, reference is made to Laplace transform methodology, which might be considered to imply the restriction to linear, lumped-constant filters and to transfer functions that may be represented as such. However, this limitation does not apply. The only necessity is the ability to analyze the transducer-medium-interface characteristic function, and the ability to synthesize its inverse, or at least a practical usable equivalent or approximation thereof.

Practical compensating filter embodiments may be realized through mechanical, fluidic, pneumatic elements, for example, as well as through electronic networks, the choice depending upon engineering considerations, and the nature of the associated system. Although the applicant's specific filter realizations have been in the form of electronic filters, nevertheless, an analogous mechanical system having the appropriate transfer function will function as well.

General Method of Analysis of the Transducer-Medium Transfer Function

Perhaps the easiest way to assess or at least estimate the transfer function of a transducer-medium system, is to simply immerse or couple the transducer to the medium so that the period of time consumed by coupling is very much less than the response time of the sensor; thereby obtaining a sufficient approximation to a so-called step excitation function.

Figure 3:
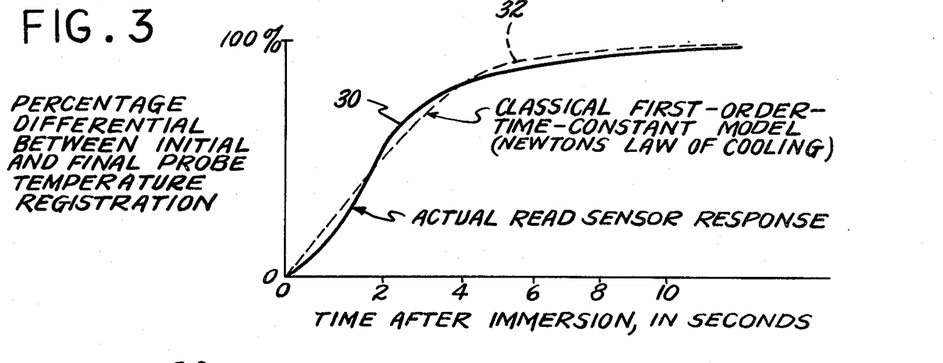
FIG. 3 is a chart or graph illustrating the time response curve of a temperature sensing probe and comparing it with the corresponding curve of the classical first-order time constant model according to Newton's Law of Cooling.

For example, a typical temperature probe, plunged into a stirred-water bath will respond to the stirred-water bath temperature in the approximate manner depicted by the solid line curve designated 30 in FIG. 3. By way of comparison, the dotted line curve designated 32 in FIG. 3 represents the classical first-order-time-constant model according to Newton's Law of Cooling.

Applying well known empirical mathematical and graphical analysis techniques to actual data typified by FIG. 3 to determine the time-domain function $f(t)$, the applicant found that a practical approximation to $f(t)$ is given by the equation:

$$f(t) = K[\ 1-(A\ e^{-t/T_\alpha} + B\ e^{-t/T_\beta} + C\ e^{-t/T_\gamma})\ ] \qquad \text{V}$$

where $f(t) = 0$ at $t = 0$

Transient Analysis Method According to the Invention

A portion of this invention shall include applicant's graphical analysis technique for extracting values of A, B, C, $T_\alpha$, $T_\beta$, and $T_\gamma$ from raw $f(t)$-vs. $t$ data, which is extremely simple compared to available prior art procedures. The applicant's technique would replace the most difficult process (using even the largest computers) of solving six simultaneous equations involving the products of unknowns (A, B, and C) with transcendental functions of unknowns $T_\alpha$, $T_\beta$, and $T_\gamma$).

The present technique, described in detail in a following section, "Procedure Details of Transient Analysis Method According to the Invention", exploits the facts that:

1. An exponential function of the form $A\ e^{-\alpha t}$ plots as a straight line on a semilog graph, with a negative slope $\alpha$ and a $t = 0$ intercept of A.

2. For a function of the general form $f(t)$, the algebraic sum of all exponential terms (of the form $A\ e^{-\alpha t}$) must intercept unity at $t = 0$, so that $f(t)$ does indeed equal 0, at $t = 0$. In other words, A+B+C=1, at $t = 0$.

3. The straight-line character of exponential terms in a "1-exponent" equation is preserved by labeling the log scale as a "1-log" scale, such that the log scale coordinate 1 becomes 0, 0.1 becomes 0.9, 0.01 becomes 0.99, etc.

The function $f(t)$ plotted on the "1-log" scale is a curve empirically resolvable into straight lines, the algebraic sum of which (using log scale coordinates) equals A $e^{-t/T\alpha}$ +B $e^{-t/T}$ +C $e^{-t/T\gamma}$. The lines are experimentally "juggled" for best fitting slope asymptotes, while keeping the $t=0$ intercepts "hinged" to the [A + B + C = unity] criterion. An example is given in FIG. 4, wherein the curve 40 is resolved into the three straight lines 42, 44, and 46. Insofar as the applicant is aware, this is the first time such a closed-form representation of transducer response characteristics has been developed.

Figure 4:
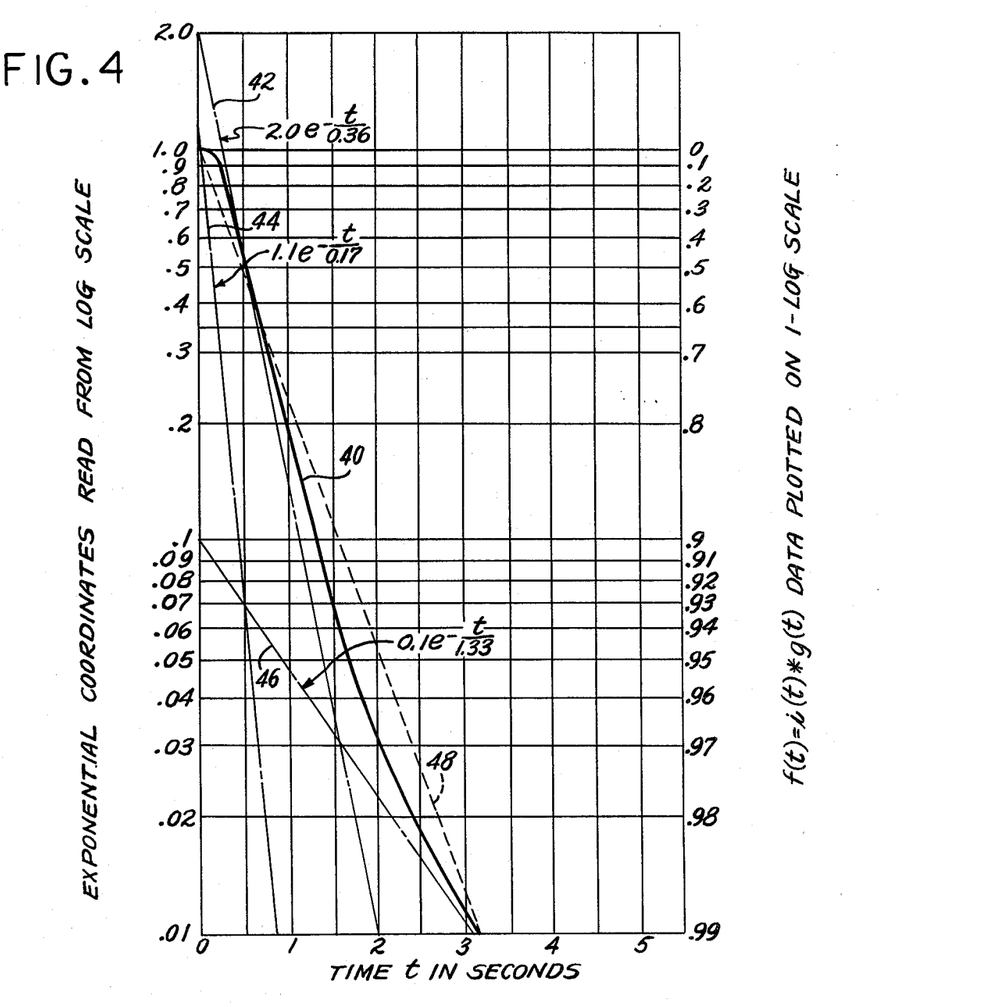
FIG. 4 is a chart or graph on a semilog scale generally illustrating the graphical technique of the present invention for approximating temperature-transducer response with a three-exponential term equation, and comparing same with the result of prior practice utilizing a single exponential term equation.

In FIG. 4, curve 40 is set forth as a representative temperature probe response to step change in a sample medium, and accordingly the various function expressions and relationships referred to hereinabove in connection with FIGS. 1, 2A, 2B, and 2C apply.

The three straight lines 42, 44, and 46 into which the curve 40 has been empirically resolved may be represented by the following expressions:

line 42: $2.0e^{-t/0.36}$
line 44: $1.1e^{-t/0.17}$
line 46: $0.1e^{-t/1.33}$

Accordingly, the composite, curve 40, may be represented as the algebraic sum of these three expressions, as follows:

composite curve $40 = 2.0e^{-t/0.36} + 0.1e^{-t/1.33} - 1.1e^{-t/0.17}$ VI

Therefore:

$f(t) = i(t)*g(t) = 1-[2.0e^{-t/0.36} + 0.1e^{-t/1.33} - 1.1e^{t/0.17}]$ VII

The result of prior practice of approximating temperaturetransducer response with a single exponential term equation, is also illustrated in FIG. 4, as the dotted straight line designated 48, to illustrate the significant refinement afforded by the present invention. In many cases, the actual 99 percent response point occurs at a larger time value than does this prior art first-order approximation.

The time-response function f(t) thus graphically determined as discussed above in connection with FIG. 4 is then translated into the characteristic transfer function. This is done by seeking the function f(t) in an established table of transform pairs, that associate time-domain functions with the corresponding Laplace transforms of same. For the specific case of $f(t) = K[1-(Ae^{-t/T\alpha} + Be^{-t/T} + Ce^{-t/T\gamma})]$ the following transform pair may be found:

$f(t) \longleftrightarrow F(s)$, where $$f(t) = \frac{T\alpha T\beta T\gamma}{Ta_o}\left[1 + \frac{T\alpha(Ta_o - T\alpha)}{(T\alpha - T\beta)(T\alpha - T\gamma)}e^{-\frac{t}{T\alpha}}\right.$$
$$+ \frac{T\beta(Ta_o - T\beta)}{(T\beta - T\alpha)(T\beta - T\gamma)}e^{-\frac{t}{T\beta}}$$
$$\left.+ \frac{T\gamma(Ta_o - T\gamma)}{(T\gamma - T\alpha)(T\gamma - T\beta)}e^{-\frac{t}{T\gamma}}\right]$$
VIII $$F(s) = \frac{T\alpha T\beta T\gamma}{Ta_o} \frac{(Ta_o s+1)}{S(T\alpha s+1)(T\beta s+1)(T\gamma s+1)}$$
IX This function was found experimentally to represent the temperature probe case, when $T\beta > Ta_o > T\gamma > T\alpha$ the order being dictated by the signs of the exponential-term coefficents. Note in FIG. 4 that the shortest time-constant term is associated with a minus sign.

The transform $F(s)$ actually represents the product of the input excitation $I(s)$, and sensor-medium combination $G(s)$ transforms. This simple product is equivalent to convolution of the input excitation and sensor-medium time-domain functions; i.e., $$f(t) = i(t) * g(t) \leftrightarrow F(s) = I(s) \times G(s)$$
X This graphical technique described hereinabove is powerful and significant because it applies to the natural stepresponse behavior of many real things. This technique will make it possible to quickly and easily determine the time-response and transfer function of devices, mechanisms, and sensors, heretofore modeled by mathematical approximations of a less exact form.

Furthermore, this graphical technique is immediately applicable to computer and/or computer-graphics mechanization. Teh present technique introduces a new, powerful so-called relaxation method for mathematical analysis of complex transcendental functions.

General Application of Transient Analysis Method of the Invention to Compensating Filters Using a step-function excitation is most expeditious, not only because it can be so readily accomplished in practice, but also because it turns out that the transform of a step function is simply $I(s) = k/s$ where $k$ is a constant scaled to the amplitude of the step function. Then, $G(s)$ can be isolated by simply dividing $F(s)$ (observed data), data), by $I(s)$ (a priori).

$$G(s) = \frac{F(s)}{I(s)} = \frac{F(s)}{k}s$$

A primary aspect of the present invention is to extract the characteristic function $G(s)$ of the sensor or transducermedium combination, then to simply couple the output of the sensor to a filter having a transfer function equal to its inverse, or $1/G(s)$ thereby "canceling" the response degradation effected by the transducer and its influence. This and summarized graphically in FIGS. 1 and 2A, 2B, and 2C.

However in real life, cancellation is impossible. Imprefections in real devices, filter stability problems, and the like, limit the achievable reduction in response time to a finite value. For the function $G(s)$ under consideration, the ideal filter $1/G(s)$ would be of the form $$\frac{1}{G(s)} = K \frac{T_{a_o}}{T\alpha T\beta T\gamma} \frac{(T\alpha\ s+1)(T\beta\ s+1)(T\gamma\ s+1)}{(T_{a_o}s+1)}$$
XI where $G(s)$ is defined as $F(s) \div k/s$ and where K and k are arbitrary scaling or gain constants.

A most significant factor limiting filter ideality is change in the effective sensor-medium transfer function, with changes in the medium itself, over the operating regime of interest. An optimum filter for a given situation or application will generally be a compromise, having more stabilizing terms (poles) in the filter transfer function than would be indicated by the model $1/G(s)$ function. In more intuitive, but possibly less exact terms, a "detuned" filter is necessary to accommodate unavoidable variations in the input signal. The extraordinarily high degree of differentiation characteristic of a $1/G(s)$ filter will greatly amplify any errors due to mismatch between sensor-medium transfer function and its approximate reciprocal as represented by the filter. "Smoothing" terms are usually necessary in practical realizations, and these terms inherently introduce lags which increase the minimum response time achievable.

Procedure Details of Transient Analysis Method According to the Invention

Procedure details for the present transient analysis method are given hereinafter for analysis of rectal temperature response for an electronic thermometer.

Rapid probe insertion approximates a step input to a thermometer probe. First, time-response data is obtained from sample recordings of the temperature data yielded by the probe. The data is then reduced to a normalized scale of percentage of response between initial and final steady-state temperatures. The curve 50 in FIG. 5 is a plot of thermometer output voltage thus scaled to percentage of response, against time in seconds.

However, since this is a practical example the prediction filter of the invention is to be allowed about 1 second to yield a 99 percent-response output signal, so exact establishment of zero-time is not critical. If a point 52, say 0.3 seconds after probe insertion, is designated as the temperature data recording, the initial-to-final normalized scale may be constructed from that (0.3 sec.) point, which is then used as the zero-time reference. In other words, truncated response data does indeed suffice. This is not only consistent with the scientific concept of response above some threshold value, but also it is a practical necessity in view of the uncertainties and noise accociated with the probe insertion event.

Figure 5:
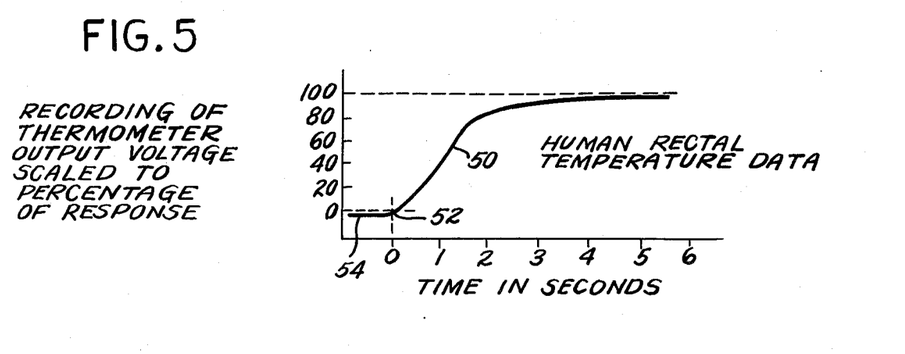
FIG. 5 is a chart of graph illustrating typical temperature probe response data, truncated close to the initial steady state conditions, for use in an application example of the present graphical analysis technique.

The example that will be first analyzed will be one as illustrated in FIG. 5 in which not only the zero time reference as indicated by the point 52 is very close to the time of probe insertion, but also the usable-data threshold as indicated by the point 52 is very close to the initial steady-state temperature of the probe, as indicated by the left end portion 54 of the curve 50.

Figure 6:
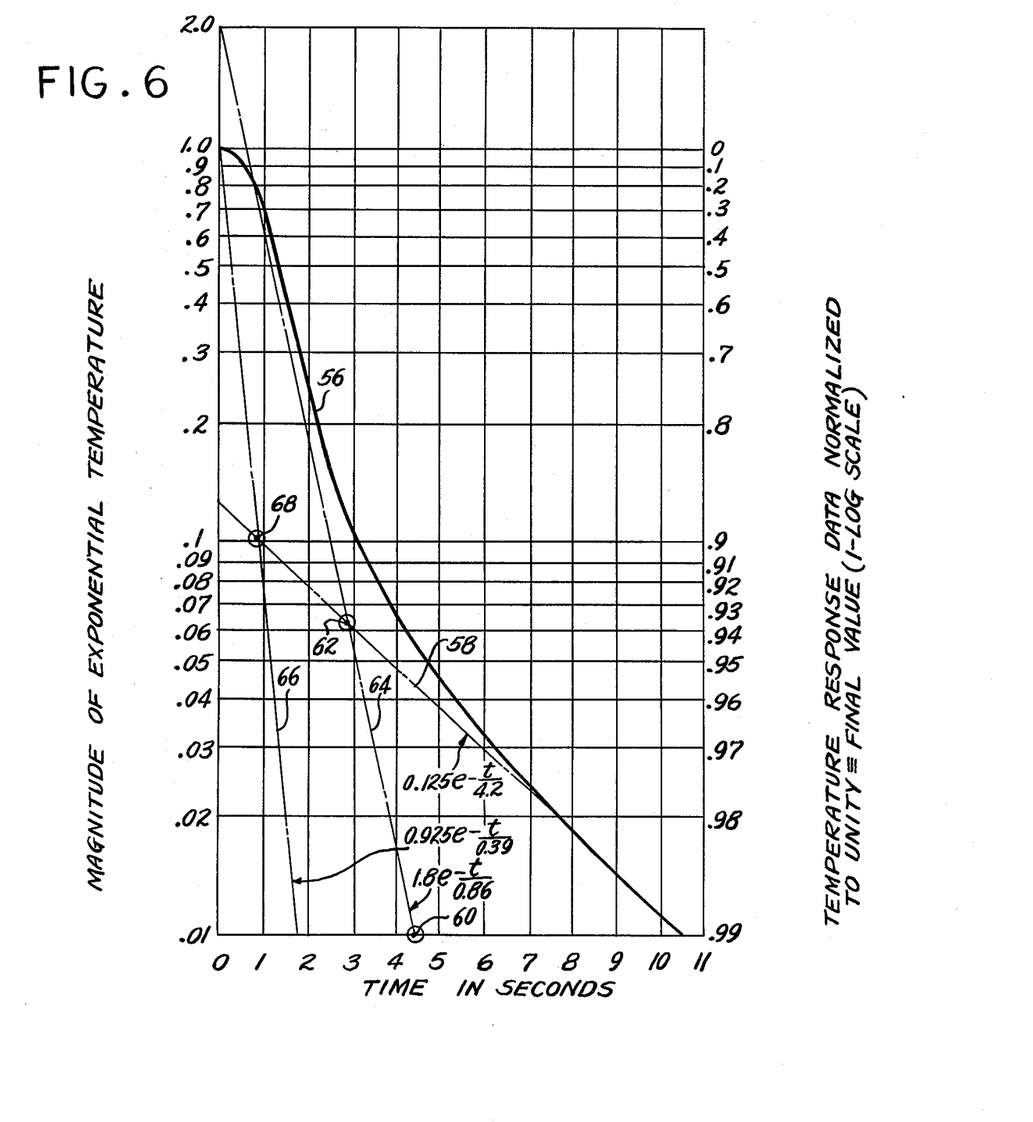
FIG. 6 is a chart or graph on a semilog scale similar to FIG. 4 illustrating the present graphical analysis technique applied in connection with the data of FIG. 5, a plot in FIG. 6 of the data from FIG. 5 being represented by three exponential functions similarly as in FIG. 4.

The data from FIG. 5 is accurately scaled and extracted in time-vs.-percent-response pairs; then transferred to the 1-log response-percentage scale and the linear time scale, on semilog paper, producing the curve 56 in FIG. 6.

The step response is presumed to be defined by a time function of the form $$1 - \sum_1^n a_k e^{-m_k t} \qquad \text{XII}$$

Hence the log scale quantifies each of the $n$ exponential constituents, each one of which plots as a simple straight line.

It turns out that in cases such as the ones depicted in FIGS. 5 and 6 where the rate of change of response first increases then decreases (where the curve in FIG. 6 is concave downward near the zero-time point), a sufficient approximation is given by $$1 - \sum_1^3 a_k e^{-m_k t} \qquad \text{XIII}$$

having three exponential terms. Approximations where $n$ is less than 2 are inadequate, and $n$ greater than 3 approximations are difficult to resolve.

The boundary condition that $$\sum_1^n a_k \equiv 1$$

(to satisfy the zero-response-at-zero-time condition), plus the easily identifiable asymptote to the final response "tail" (data in the 95–99 percent response regime), makes the simultaneous solution of the three straight-line (exponential) functions a relatively simple, sequentially-executed procedure:

Referring to FIG. 6, construct an asymptote to the near-straigth-line tail of line 56, such asymptote being designated 58. Then, locate the time value at which 0.01 plus the magnitude of line 58 equals the data curve. Locate the corresponding point 60 at the intersection of this time value and the exponential coordinate 0.01. Next, move along line 58 to the point 62 equal to exactly half the magnitude of the data curve. Construct a straight line 64 through these two points 60 and 62. Now, the algebraic sum of the functions represented by 58 and 64 equals the data curve function at least at these two points.

Because of the relationship between intercepts and slopes, the contribution of the third straight line 66 (not yet determined) will in most cases have little effect on the portion of the curve in the vicinity of the points used to locate line 64. Line 58 is usually the least ambiguous and should remain fixed during any subsequent juggling operations on lines 64 and 66.

To construct line 66, sum the two $t = 0$ intercepts of lines 58 and 64. This sum, minus unity (1.00), equals the $t = 0$ intercept of line 66 (not yet constructed). Locate the intercept of line 64 with the data curve. A vertical line (time value) dropped from this line 64-data-curve intercept, intercepts line 58 at the (line 58-line 66) intercept 68. Now construct line 66 between this point 68 on line 58, and the $t = 0$ intercept point just determined. Note that lines 58−66+64 describe the data curve at the two points just determined.

Check the conformance of lines 58, 64, and 66 with the actual data curve by forming the algebraic sums of the exponential coordinate values of lines 58, 64, and 66 at various time values. The sum of 58 and 64, minus 66 should closely approximate the data curve at any given value of time. Juggle lines 64 and 66 as required to achieve a closer approximation.

Once the lines are adequately established, determine graphically the equation of each line. The constant $a_k$ is given by the $t = 0$ intercept, and the exponent constant $m_k$ is obtained by dividing 2.303 by the value of $t$, one decade below the $t = 0$ intercept. The more desirable form for subsequent computations calls for the reciprocal of $m_n$, as exemplified by the equations referred to hereinabove in connection with FIG. 4, such as equations VI and VII. The equation of the data curve 56 in FIG. 6 viewed as this exponential composite and using the log scale coordinates, is seen to be $$0.125\ e^{-t/4.2} + 1.80 e^{-t/0.86} - 0.925\ e^{-t/0.39}$$

XIV and the corresponding equation of interest, that of the data curve as originally plotted on the 1-log scale, is $$f(t) = 1 - (0.125\ e^{-t/4.2} + 1.80 e^{-t/0.86} - 0.925\ e^{-t/0.39}) \quad \text{XV}$$

Relating to the appropriate transform pair, $$f(t) = \frac{T\alpha T\beta T\gamma}{Ta_o} \left[ 1 + \frac{T\alpha(Ta_o - T\alpha)}{(T\alpha - T\beta)(T\alpha - T\gamma)} e^{-\frac{t}{T\alpha}} \right.$$
$$+ \frac{T\beta(Ta_o - T\beta)}{(T\beta - T\alpha)(T\beta - T\gamma)} e^{-\frac{t}{T\beta}}$$
$$\left. + \frac{T\gamma(Ta_o - T\gamma)}{(T\gamma - T\alpha)(T\gamma - T\beta)} e^{-\frac{t}{T\gamma}} \right] \quad \text{VIII}$$

$$F(s) = \frac{T\alpha\ T\beta\ T\gamma}{Ta_o} \cdot \frac{(T_{a_o} s + 1)}{s(T\alpha\ s+1)(T_\beta\ s+1)(T\gamma\ s+1)} \quad \text{(IX)}$$

we find that the only graphically-undertermined unknown is $T_{a_o}$.

Ideally, $T_{a_o}$ can be determined algebraically using any one of the three exponential-term coefficient expressions, and the value of $T_{a_o}$ derived should remain fairly independent of the coefficient used. To illustrate how powerful the present transient analysis method is, the graphical work in FIG. 6 was a first approximation with no juggling or adjusting after the initial trial plots. Using the equation of line 58 as the most reliable reference, and consequently the basis of computing a trail $T_{a_o}$:

$$T_{a_o} = \frac{-0.125(T\beta\ -T\alpha\ )(T\beta\ -T\gamma\ )}{T} + T = 3.82 \quad \text{XVI}$$

As a check on the accuracy of the graphical assumptions, plotted data, and f(t) hypothesis, the $T_{a_o}$ computed is used in conjunction with $T\alpha$, $T\beta$, and $T\gamma$, to derive consistent values of coefficients (i.e., $t = 0$ intercepts). Solving for the γ-term coefficient (line 64):

$$-1.80 \stackrel{?}{=} \frac{T\gamma\ (T_{a_o} - T\gamma\ )}{(T\gamma\ -T\alpha\ )(T\gamma\ -T\beta\ )} =$$
$$-\frac{0.86(2.961)}{(0.47)(3.34)} = -1.62 \quad \text{XVII}$$

Also for the α-term coefficient:

$$0.925 = \frac{T\alpha\ (T_{a_o} - T\alpha\ )}{(T\alpha\ -T_\beta\ )(T\alpha\ -T\gamma\ )} =$$
$$\frac{0.39(3.43)}{(3.81)(0.47)} = 0.749 \quad \text{XVIII}$$

Checking the únity criterion (which checks arithmetic accuracy only):

$$-1.62 - 0.125 + 0.749 = 0.996 \cong 1.00 \quad \text{XIX}$$

The remarkable conformity is even more evident when the mathematically derived coefficients ($t = 0$ intercepts) for lines 64 and 66 are compared with the construction in FIG. 6. The differences are small, confirming the underlying hypothesis and assumptions. Interdependent juggling of $T\alpha$ and $T\gamma$ (slopes of lines 64 and 66) would achieve even a closer overall estimate. Note that perturbing $T\alpha$ and $T\gamma$ would require a recomputing of $T_{a_o}$. For the academically inclined, $T_{a_o}$ can be recomputed for each of the three coefficient expressions until the sufficiently optimum values of $T\alpha$ and $T\gamma$ are selected, that results in minimum deviation of $T_{a_o}$ (when $T_{a_o}$ is computed three separate ways from the graphical coefficients and slopes for lines 58, 64, and 66, in FIG. 6). The values of $T\alpha$, $T_\beta$, $T\gamma$, and the value of $T_{a_o}$ derived therefrom, are usually adequate after no more than one recomputation, to construct a prediction filter, given by the expression $$\frac{\frac{K}{s}}{F(s)} = \frac{1}{G(s)} \quad \text{XX}$$

where, in the example of FIG. 6, $$\frac{1}{G(s)} = \frac{(T\alpha\ s+1)(T\beta\ s+1)(T\gamma\ s+1)}{(T_{a_o} s+1)} =$$
$$\frac{(0.39s+1)(4.2s+1)(1.80s+1)}{(3.82s+1)} \quad \text{XXI}$$

(k being merely a proportionality constant)
This filter function or a sufficiently close approximation thereto, can be synthesized from electrical components in accord with established active-filter design theory and practice. Time-constant adjustments are provided to determine experimentally the fastest response to a step input (caused by rapidly inserting the temperature probe).

Further Procedure Details — Example with Only Two Exponential Functions

Figure 7:
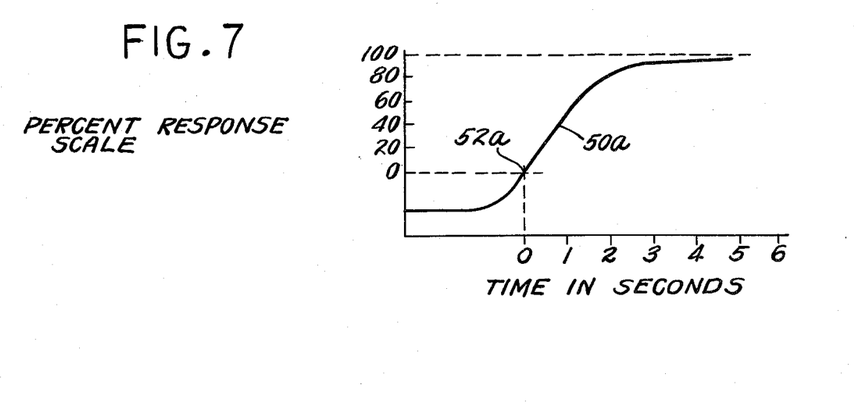
FIG. 7 is a chart or graph similar to FIG. 5, but further truncated to minimize inflection point complications.

Response curves which do not possess an inflection point, or in which the inflection point may be neglected, are simpler to analyze. This condition is realizable by truncating the response data shortly after, but sufficiently close to zero-time, as shown in FIG. 7. When the no-inflection-point condition exists, the rate of change of response is always decreasing. The corresponding log plot in FIG. 8 is always concave upward and therefore may be represented by only two exponential functions, i.e., $$f(t) \cong 1 - \sum_1^2 a_k e^{-m_k t} \quad \text{XXII}$$

Figure 8:
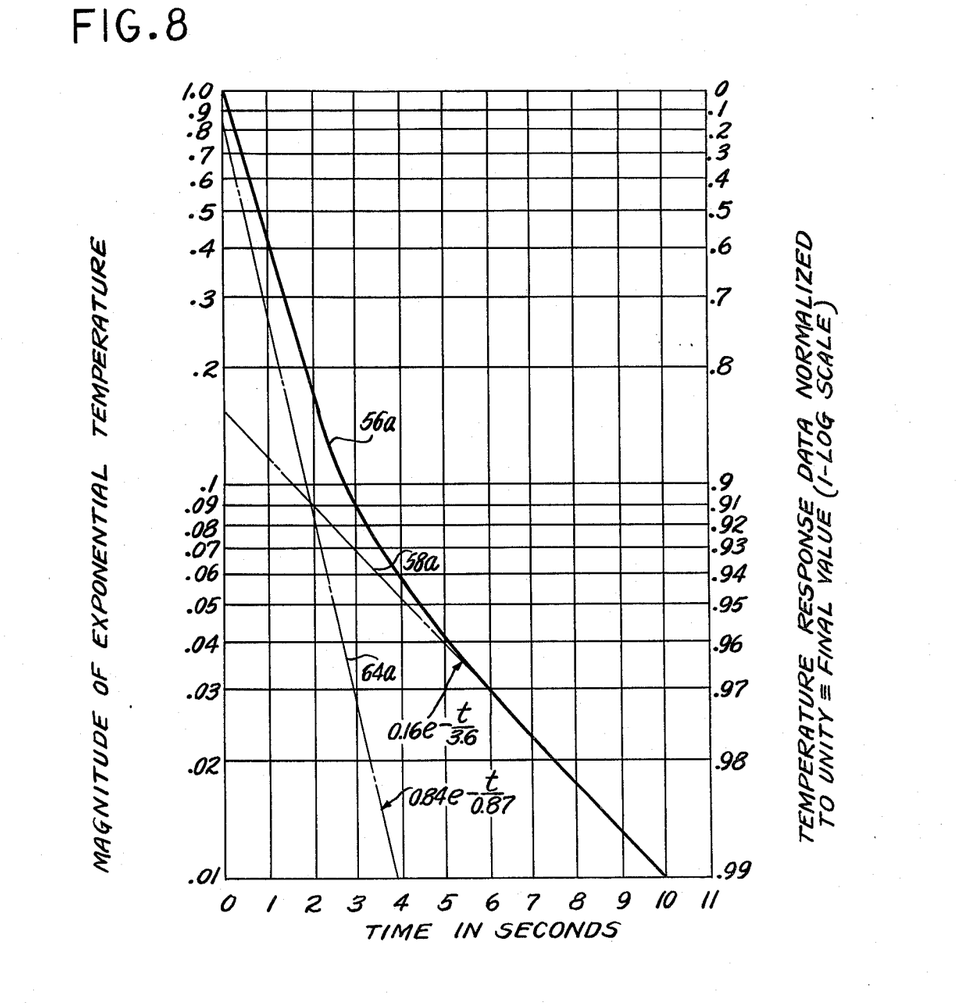
FIG. 8 is a chart or graph on a semilog scale similar to FIG. 6, but with the plot corresponding to the data of FIG. 7 and represented by only two exponential functions, illustrating a simplified graphical analysis technique according to the invention.

The case illustrated in FIGS. 7 and 8 is the same as in FIGS. 5 and 6, except that the response curve 50a in FIG. 7 was truncated by 0.4 seconds at the point 52a. The case illustrated in FIG. 8 is the same as in FIG. 6, except that the response curve was truncated by 0.4 seconds. Percentage response points were recomputed to accommodate this change in reference. Note that in FIGS. 7 and 8 an inflection point still exists, but the error thereby introduced does not preclude a sufficiently close approximation. The graphical construction procedures illustrated in FIG. 8 are much less ambiguous for this case. The scales are constructed as in FIG. 6. Again, line 58a is least ambiguous and is constructed first. The boundary condition, $\Sigma a_k = 1$ (to satisfy the zero-response, zero-time criterion) immediately establishes the $t = 0$ intercept for line 64a ($1 - 0.16 = 0.84$). Additional points along the line 64a are determined by the algebraic difference between the data curve 56a and line 58a. One such point is the intersection of line 58a at the point where line 58a is equal to one-half the value of the data curve 56a.

Using the log scale, this exponential composite is seen to be $$0.84 e^{-t/0.87} + 0.16 e^{-t/3.6}$$

XXIII and the corresponding response equation (derived from the 1-log scale) is $$f(t) = 1 - 0.84 e^{-t/0.87} - 0.16 e^{-t/3.6}$$

XXIV

This equation fits the following transform pair:

$$f(t) = \frac{T\alpha T\beta}{Ta_o}\left[1 - \frac{(Ta_o - T\alpha)}{(T\beta - T\alpha)}e^{-\frac{t}{T\alpha}} - \frac{(T\beta - Ta_o)}{(T\beta - T\alpha)}e^{-\frac{t}{T\beta}}\right]$$

XXV $$F(s) = \frac{T\alpha T\beta}{Ta_o}\left[\frac{(Ta_o s + 1)}{s(T\alpha s+1)(T\beta s+1)}\right]$$ XXVI with $T\alpha > T_{a_o} > T\beta$ ; or $T\beta > T_{a_o} > T\alpha$ In this case $T_{a_o}$ can be unambiguously computed from either coefficient term:

$$T_{a_o} = 0.84 (T\beta - T\alpha) + T\alpha = 0.84 (2.73) + 0.87 = 3.16$$

XXVII or $$T_{a_o} = T\beta - 0.16 (T\beta - T\alpha) = 3.6 - 0.16 (2.73) = 3.16$$

XXVIII

Thus, the resulting simplified prediction filter approximation is $$\frac{1}{G(s)} = \frac{(T\alpha s+1)(T\quad s+1)}{(I_{a_o} s+1)} = \frac{(0.87 s+1)(3.6 s+1)}{(3.16 s+1)}$$ XXIX

A Basic Prediction Filter Example

Figures 9, 10:
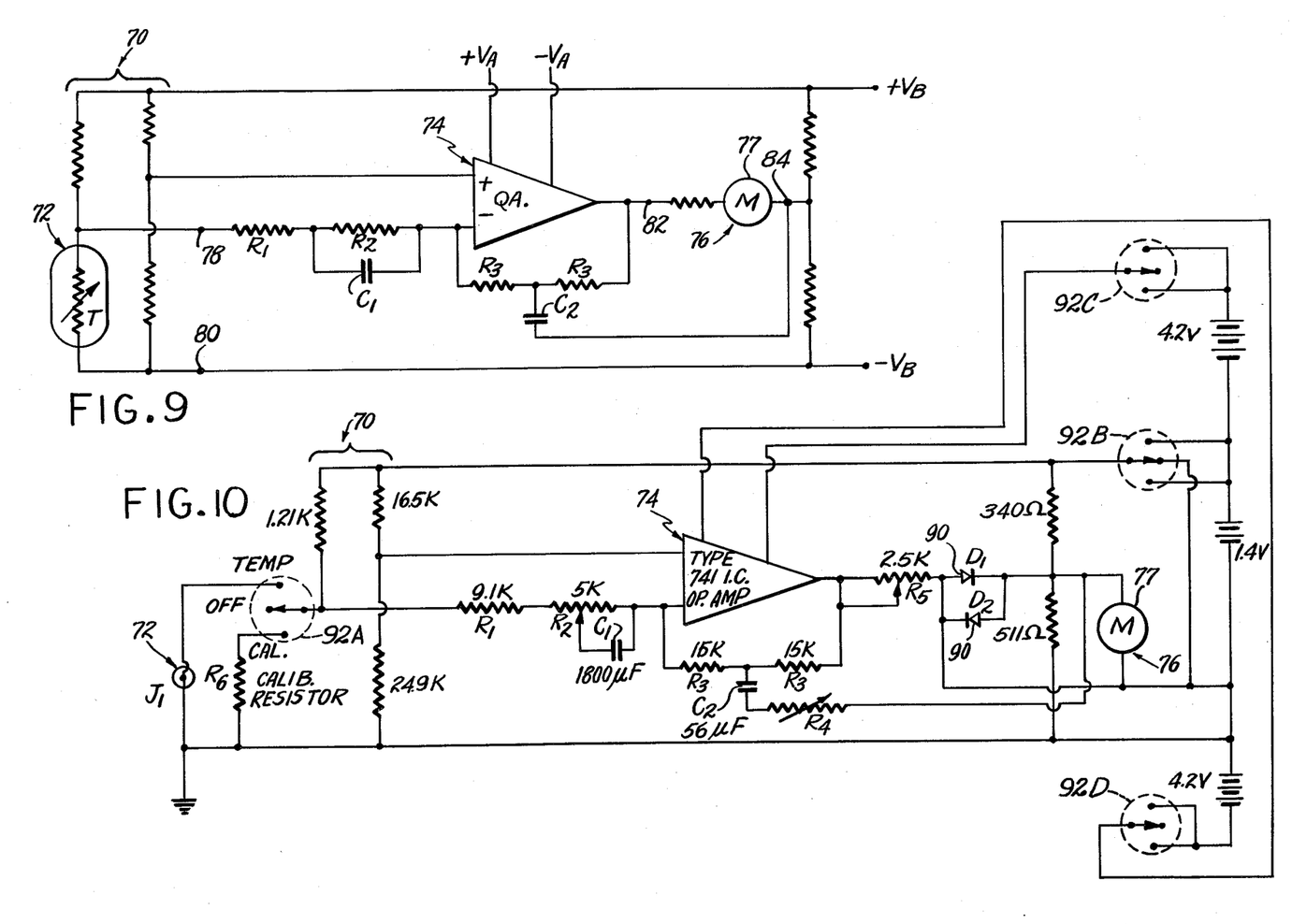
FIG. 9 is an electronic circuit diagram illustrating a basic prediction filter circuit according to the invention.
FIG. 10 is a circuit diagram similar to FIG. 9, but illustrating application of the filter circuit of FIG. 8 to an electronic thermometer.

FIG. 9 illustrates a basic electronic prediction filter circuit example determined in accordance with the invention and capable of overall 99 percent response times in the order of one second for use in medical thermometry. The transfer function values were determined by the graphical technique set forth hereinabove, and do not take into account the time constant introduced by the internally compensated operational amplifier forming a part of the circuit, which is on the order of about 0.02 seconds.

The circuit of FIG. 9 includes a sensor network generally designated 70 which includes as an element thereof a thermally responsive resistance 72 representing a thermistor sensing probe. The sensor network 70 is arranged to generate a voltage signal proportional to temperature over the range of interest. The circuit also includes an internally compensated operational amplifier 74, and a display circuit 76, which may include as the display device a meter 77. Imaginary "terminals" 78 and 80 designate input from the sensor network 70, while terminals 82 and 84 designate output, with terminal 84 representing signal ground.

The prediction filter components of the FIG. 9 circuit are, for mathematical convenience, labeled in conventional "R" and "C" designations, and include resistors $R_1$ and $R_2$, a pair of resistors $R_3$ of equal value, and capacitors $C_1$ and $C_2$. $R_1$ includes the input resistance of the sensor network 70.

Standard active-filter-synethesis techniques were used to achieve the requisite reciprocal filter function from the transfer function values, as follows:

$$\frac{1}{G(s)} \cong \frac{A_2(T_2 s+1)(T_1 s+1)}{A_1(\theta T_1 s+1)}$$ XXX where $A_1 = R_1 R_2$
$R_1 = A_1 \theta$
$C_1 = \dfrac{T_1}{A_1(1-\theta)}$ $A_2 = 2R_3$
$C_2 = 4T_2/A_2$ In a typical case:
$\Theta = 0.84$
$T_1 = 4.7$ seconds
$T_2 = 0.9$ seconds For a ratio of $A_2/A_1 = 2$, and a balanced input resistance of $10^4$ ohms to minimize common mode errors,
$A_1 = 1.5 \times 10^4$
$A_2 = 3.0 \times 110^4$ Thus,
$C_1 = 1.93\ 10^{-3}$ farad
$C^2 = 1.2\ 10^{-4}$ farad

Medical Thermometer Circuit Embodying the Basic Prediction Filter Example

FIG. 10 illustrates the circuit of a medical thermometer incorporating the basic prediction filter circuit shown in FIG. 9, the circuit of FIG. 10 being adapted principally for use in rectal temperaturing applications. To most perfectly adapt the filter to the particular temperature probe and medium in question, the capacitance as well as the resistance values should be adjustable. However, in experimental examples the practical expedient of adjusting resistance values only has been found generally sufficient.

According, in the circuit of FIG. 10, the primary response adjustment is provided by making $R_2$ variable, which permits adjustment of the large time constant $T_1$ in equation XXX. Added variable resistor $R_4$ in series with capacitor $C_2$ provides a response trim adjustment, permitting adjustment of the short time constant $T_2$ in equation XXX. The resistor $R_4$ incidentally introduces a "parasitic" lag term.

Added variable resistor $R_5$ in the output of operational amplifier 74 provides full-scale calibration adjustment, and by being outside of the prediction filter portion of the circuit does not otherwise affect the temperature measuring function.

It is to be noted that the filter output is balanced in the circuits of both FIG. 9 and FIG. 10. This is preferred, in order to minimize common-mode drift and long-term stability errors.

In the specific example of FIG. 10, the thermally responsive resistance 72 comprises a temperature probe incorporating a Y.S.I. thermistor bead having 3000 ohms at 77°F. The meter 77 in the example of FIG. 10 is a 0–50 microampere D.C. meter, scaled 98° to 108°F.

While a specific circuit arrangement, specific circuit components, and specific component values and types are designated in the drawing and description of FIG. 10, these are set forth by way of example only and not of limitation, and it is to be understood that these are only for the particular thermometer application and inverse filter function of the example and that other circuit arrangements, circuit component values, and operational amplifier types will be utilized by those skilled in the art to implement the principles of the present invention for other measurement and control system examples.

Similarly, although the display circuit 76 is shown as including a meter 77 as the display device, it is to be understood that any other display device, as for example a digital display device, may be employed within the scope of the invention.

A pair of silicon alloy-junction diodes 90 are employed in the display circuit 76 to protect the meter 77 or to limit the voltage levels applied to any other display device used to register temperature data.

A 4-deck, three-position switch 92 is included in the circuit of FIG. 10, the switch 92 being selectively movable from the "off" position, which is the position illustrated, to a "temperature" position wherein the circuit is operative for the temperaturing and compensating functions, or to a "calibration" portion wherein a calibration resistor $R_6$ is substituted for the probe 72 in the circuit. The switch deck 92A provides the alternative connection to the probe 72 or to the calibration resistor $R_6$, while the switch deck 92B energizes the circuit, and the decks 92C and 92D provide power to the operatonal amplifier 74.

Calibration of the circuit is accomplished by simply placing the switch 92 in the calibrate position and then adjusting the variable calibration resistor $R_5$ until the needle of meter 77 registers with a calibrate mark on the scale, or the readout signal of any other display device that may be employed registers with some predetermined readout indication. Normally, the response trim adjustment (short time constant) of the variable resistor $R_4$ is a factory adjustment, while the primary response adjustment (large time constant) of the variable resistor $R_2$ is a field adjustment that may be employed to modify the prediction filter response too accommodate different environments, as for example rectal versus oral temperaturing.

Medical Thermometer and Disposable Sheath Structures

Figure 11:
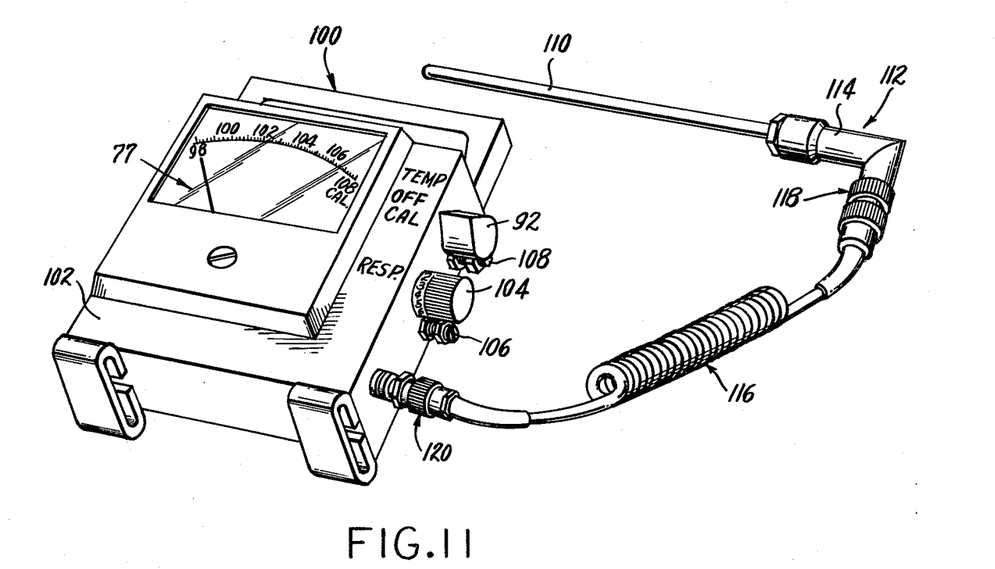
FIG. 11 is a pictorial view of an electronic thermometer utilizing a circuit like that illustrated in FIG. 9.

FIG. 11 illustrates a medical thermometer structure generally designated 100 of a type suitable for use with the circuit shown in FIG. 10 and described in detail hereinabove. Thermometer 100 includes a housing 102 having the meter 77 exposed on the front face thereof. On one side of the housing are the switch 92; a control knob 104 for adjusting the variable resistor $R_2$; and adjusting screws 106 and 108 for adjusting the respective variable resistors $R_4$ and $R_5$, these screws preferably being secured by lock nuts.

The thermometer structure 100 also includes a temperature sensing probe 110, preferably in the form of a stainless steel tube that is closed at its free end and has a temperature responsive element such as a thermister bead embedded therein. The probe 110 is mounted in a generally L-shaped tubular support "elbow" 112 having a probe mounting arm portion 114 generally coaxial with the probe 110, and an electrical coupling arm portion 116 generally at right angles to the portion 114. A retractable coaxial cable 116 connects the two thermistor leads to the circuit in housing 100, through coaxial connectors 118 and 120 at its respective ends.

As an example of how the time lag compensation of the present invention allows strength and utility to be preserved without seriously degrading response, a disposable elastomeric probe sheath may be engaged over a temperature sensing probe such as the probe 110 of FIG. 11 prior to the operative insertion of the probe, and this protective probe covering, even though it be of poor thermally conducting material, will not seriously degrade the reponse of the compensated thermometer. Because no special heat-conductive film or other artifices are required, an inexpensive common finger cot of prophylactic design functions quite adequately. A disposable elastomeric probe sheath is more durable and reliable and generally more sanitary than special fast-response probe sheaths of particularly good heat-conductive material.

Figure 12:
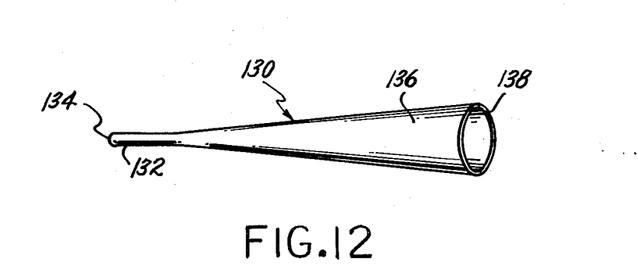
FIG. 12 is an isometric view showing novel thermometer probe sheath according to the invention.
Figure 13:
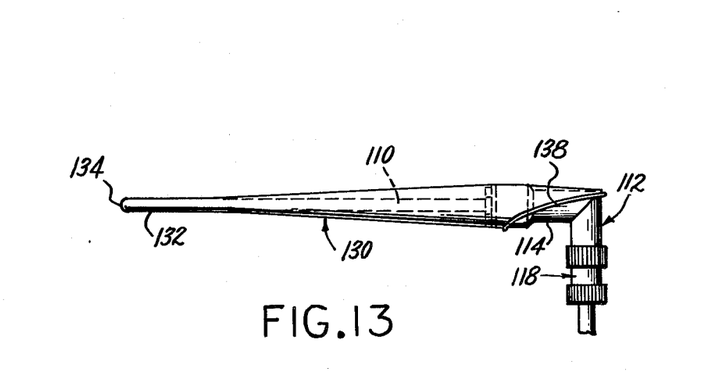
FIG. 13 is a side elevational view illustrating the manner in which the sheath of FIG. 12 is mounted on a probe.

FIGS. 12 and 13 illustrate an elastomeric probe sheath 130 of novel construction and opeation forming a part of the present invention. The sheath 130 has a generally cylindrical forward portion 132 having a diameter preferably slightly less than that of the foward portion of the probe 110. The forward sheath portion 132 terminates in a closed tip portion 134. The sheath flares rearwardly from the forward portion 132 in a generally conical body portion 136, teminating in a beaded rim portion 138. The unstretched length of the sheath from the tip 134 to the rim 138 is somewhat shorter than the distance from the probe tip to the back side of the L-shaped probe support 112. The sheath 130 may be composed of latex or other suitable resilient material.

In operation, the sheath is simply engaged over the probe 110 from the tip end thereof and stretched so as to engage part of the rim 138 over the elbow of the probe support 112 as shown in FIG. 13. The sheath is provided with the required thickness and detailed configuration proximate the tip portion 134 to minimize the probability of puncture under such stretching. The forward sheath portion 132 generally conforms with the forward portion of the probe 110 over that portion of the probe to which the thermister therein is sensitive, which typically will be about 1–2 cm.

This sheath configuration results in a generally uniform and predictable prophylactic covering over the forward temperature-sensitive portion of the probe to provide generally uniform thermal conductivity as well as structural integrity and hence sterility. The generally conical shape of the body portion 136 minimizes the "folded umbrella" wrinkling that would otherwise occur when the sheath is stretched over the probe.

This novel sheath cnfiguration cooperates with the probe having the elbow type support in a new mode of operation that greatly decreases probe disposal time to make it more compatible with the fast response time of the thermometer, and also makes the sheath disposal highly sanitary. The stretched sheath is disposed of by simply lifting or pushing the engaged part of the rim 138 off of the elbow so as to allow the used sheath to "shoot" off of the probe, like a rubber band, into a waste receptacle.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. A method of reducing the response time of a sensor positioned in a medium under observation comprising the steps of:
   a. placing the sensor in the medium under observation,
   b. feeding output signals from the sensor to filter means having a transfer function equal to the reciprocal of the sensor/medium characteristic function, said sensor/medium characteristic function corresponding to a sensor/medium response function $f(t)$ represented by a sum of at least two exponential terms, each term having the form $ae^{-Mt}$, where $a$ and $M$ are constants and $t$ is the time parameter,
   c. modulating said signals by said filter means, and
   d. feeding output signals from said filter means to indication means.

2. A method of reducing response times as recited in claim 1 wherein said sensor comprises temperature transducer means.

3. A method of reducing response times as recited in claim 1 further comprising the steps of:
   rapidly positioning said sensor in the medium, and determining said filter transfer function by the steps of:
   measuring the sensor/medium response function,
   approximating said sensor/medium response function $f(t)$ by the relation $$f(t) = 1 - \sum_{k=1}^{l} [A_k^{-M_k t}] \underline{A_k e^{-M_k t}}$$

where, $$l \geq 2$$

$$\sum_{k=1}^{l} A_k = 1$$

$A_k$ is a constant $M_k$ is a constant calculating the filter transfer function according to the relation $$H(s) = \frac{k}{s} \quad \frac{1}{F(s)}$$

$H(s)$ = the Laplace transform of the filter
$F(s)$ = the Laplace transform of $f(t)$
$k$ = a proportionality constant
$a$ = Laplace complex variable.

4. A method of minimizing response time as recited in claim 3 wherein said sensor comprises temperature transducer means.

5. A method of reducing the response time of a sensor positioned in a medium under observation comprising the steps of:
   a. rapidly positioning the sensor in the medium under observation,
   b. feeding output signals from the sensor to filter means having a transfer function equal to the reciprocal of the sensor/medium characteristic function, said sensor/medium characteristic function corresponding to a sensor/medium response function $f(t)$ substantially approximated by a sum of two exponentials having the form $$f(t) = A_1 e^{-M_1 t} + A_2 e^{-M_1 t}$$

where $f(t) = 0$ at $t = 0$ and $A_1$, $M_1$, $A_2$, $M_2$ are constants and $t$ is the time parameter, modulating said signals by said filter means and feeding output signals from said filter means to indication means.

6. Apparatus for sensing a basic excitation provided by a medium under observation comprising:
   sensor means having an input responsive to the basic excitation of the medium,
   said sensor means having an output,
   said sensor output providing output signals having a sensor/medium response function approximately represented by a sum of at least two exponential terms,
   compensating filter means connected to receive said sensor output signals,
   said compensating filter means having a transfer function equal to the reciprocal of the sensor/medium characteristic function $G(s)$, said sensor/medium response function $f(t)$ substantially approximated by a sum of at least two exponential terms of the form $Ae^{-t/T}$, where $T$ and $A$ are constants, and $s$ is the Laplace complex variable and $t$ is the time parameter.

7. Apparatus as defined in claim 6, wherein said sensor means comprises temperature transducer means.

8. Apparatus as defined in claim 6, wherein said compensating filter means comprises electrical filter circuit means.

9. Apparatus as defined in claim 6, wherein said sensor means comprises a thermometer probe having electrical transducer means therein, and said compensating filter means comprises electrical filter means.

10. Apparatus as defined in claim 9, wherein said transducer means comprises a thermistor.

11. Apparatus as defined in claim 9, which includes a disposable resilient sheath releasably engaged over said probe.

12. Apparatus as recited in claim 6 wherein said sensor/medium response function is approximately by $$f(t) = A_1 e^{-t/T} + A_2 e^{-t/T}$$

and said filter transfer function is proportional to $$\frac{(T_2 s+)(T_1 s+1)}{(T_1 s+1)}$$

where $A_1$, $T_1$, $A_2$ and $T_2$ are constants.

13. Apparatus as recited in claim 12 wherein said compensating filter means comprises a. operational amplifier means,
b. input impedance means connected to said operational amplifier means, and
c. feedback impedance means connected to said operational amplifier means.

14. Apparatus as recited in claim 13 wherein said input impedance means comprises a RC network and said feedback impedance means comprises a RC network.

* * * * *